(12) United States Patent
Chandra et al.

(10) Patent No.: US 10,364,978 B2
(45) Date of Patent: Jul. 30, 2019

(54) SEPARATORS AND MIXERS FOR DELIVERING CONTROLLED-QUALITY SOLAR-GENERATED STEAM OVER LONG DISTANCES FOR ENHANCED OIL RECOVERY, AND ASSOCIATED SYSTEMS AND METHODS

(71) Applicant: GlassPoint Solar, Inc., Fremont, CA (US)

(72) Inventors: Manish Chandra, Fremont, CA (US); John Setel O'Donnell, Palo Alto, CA (US)

(73) Assignee: GlassPoint Solar, Inc., Fremont, CA (US)

( * ) Notice: Subject to any disclaimer, the term of this patent is extended or adjusted under 35 U.S.C. 154(b) by 0 days.

(21) Appl. No.: 15/417,899

(22) Filed: Jan. 27, 2017

(65) Prior Publication Data
US 2017/0219203 A1    Aug. 3, 2017

Related U.S. Application Data

(60) Provisional application No. 62/289,644, filed on Feb. 1, 2016.

(51) Int. Cl.
*F22B 1/00* (2006.01)
*E21B 43/24* (2006.01)
(Continued)

(52) U.S. Cl.
CPC .............. *F22B 1/006* (2013.01); *E21B 43/24* (2013.01); *F01K 3/242* (2013.01); *F22B 1/22* (2013.01); *F22B 37/26* (2013.01); *Y02P 80/154* (2015.11)

(58) Field of Classification Search
CPC ....................................................... F22B 1/006
(Continued)

(56) References Cited

U.S. PATENT DOCUMENTS

| 1,240,890 A | 9/1917 | Shuman et al. |
| 2,859,745 A | 11/1958 | von Brudersdorff |

(Continued)

FOREIGN PATENT DOCUMENTS

| CN | 201359397 | 12/2009 |
| DE | 102004013590 A1 | 10/2005 |

(Continued)

OTHER PUBLICATIONS

Adventures in Energy, "Extracting Oil and Natural Gas." 1 page, accessed Oct. 7, 2013.

(Continued)

*Primary Examiner* — Avinash A Savani
(74) *Attorney, Agent, or Firm* — Perkins Coie LLP

(57) ABSTRACT

Separators and mixers for delivering controlled-quality solar-generated steam over long distances for enhanced oil recovery, and associated systems and methods. A representative method includes heating water to steam at a solar field, separating a liquid fraction from the steam, directing the steam toward a target steam user via a first, steam conduit, and directing the liquid fraction toward the target steam user in parallel with the steam via second, liquid fraction conduit. The method can further include mixing the liquid fraction and the steam before delivering the combined liquid fraction and steam to the target user.

24 Claims, 8 Drawing Sheets

(51) Int. Cl.
*F22B 37/26* (2006.01)
*F01K 3/24* (2006.01)
*F22B 1/22* (2006.01)

(58) Field of Classification Search
USPC .............................................. 126/634, 646
See application file for complete search history.

(56) References Cited

U.S. PATENT DOCUMENTS

| | | |
|---|---|---|
| 3,962,873 A | 6/1976 | Davis |
| 3,994,341 A | 11/1976 | Anderson et al. |
| 4,143,642 A | 3/1979 | Beaulieu |
| 4,174,752 A | 11/1979 | Slater et al. |
| 4,209,222 A | 6/1980 | Posnansky |
| 4,230,095 A | 10/1980 | Winston |
| 4,258,696 A | 3/1981 | Gopal |
| 4,262,653 A | 4/1981 | Holland |
| 4,296,739 A | 10/1981 | Bolding |
| 4,333,447 A | 6/1982 | Lemrow et al. |
| 4,372,386 A | 2/1983 | Rhoades et al. |
| 4,392,531 A | 7/1983 | Ippolito |
| 4,445,499 A | 5/1984 | Platell |
| 4,452,229 A | 6/1984 | Powers |
| 4,452,233 A | 6/1984 | Goodman, Jr. |
| 4,513,733 A | 4/1985 | Braun |
| 4,577,679 A | 3/1986 | Hibshman |
| 5,018,576 A | 5/1991 | Udell et al. |
| 5,048,507 A | 9/1991 | Ridett |
| 5,058,675 A | 10/1991 | Travis |
| 5,699,785 A | 12/1997 | Sparkman |
| 5,941,238 A | 8/1999 | Tracy |
| 5,954,046 A | 9/1999 | Wegler |
| 6,220,339 B1 | 4/2001 | Krecke |
| 6,547,210 B1 | 4/2003 | Jeffrety |
| 7,028,685 B1 | 4/2006 | Krecke |
| 7,234,314 B1 | 6/2007 | Wiggs |
| 7,337,843 B2 | 3/2008 | Mecham et al. |
| 7,472,548 B2 | 1/2009 | Meksvanh et al. |
| 7,992,553 B2 | 8/2011 | Le Lievre |
| 8,701,773 B2 | 4/2014 | O'Donnell et al. |
| 8,748,731 B2 | 6/2014 | MacGregor et al. |
| 9,291,367 B2 | 3/2016 | O'Donnell et al. |
| 2002/0108745 A1 | 8/2002 | Kimura |
| 2003/0080604 A1 | 5/2003 | Vinegar et al. |
| 2006/0048770 A1 | 3/2006 | Meksvanh et al. |
| 2006/0124360 A1 | 6/2006 | Lee et al. |
| 2007/0056726 A1 | 3/2007 | Shurtleff |
| 2007/0209365 A1 | 9/2007 | Hamer et al. |
| 2008/0066736 A1 | 3/2008 | Zhu |
| 2009/0056699 A1 | 3/2009 | Mills et al. |
| 2009/0056944 A1 | 3/2009 | Nitschke |
| 2009/0199847 A1 | 8/2009 | Hawley |
| 2009/0294092 A1 | 12/2009 | Bahl et al. |
| 2009/0320830 A1 | 12/2009 | Bennett |
| 2010/0000733 A1 | 1/2010 | Chiesa et al. |
| 2010/0175687 A1 | 7/2010 | Zillmer et al. |
| 2010/0212894 A1 | 8/2010 | Latimer et al. |
| 2011/0017274 A1 | 1/2011 | Huang et al. |
| 2011/0203577 A1 | 8/2011 | Coduri |
| 2011/0277470 A1 | 11/2011 | Benyaminy et al. |
| 2012/0125611 A1 | 5/2012 | Ayirala et al. |
| 2012/0138293 A1 | 6/2012 | Kaminsky et al. |
| 2012/0138316 A1 | 6/2012 | Matzakos |
| 2012/0152307 A1 | 6/2012 | MacGregor et al. |
| 2012/0167873 A1 | 7/2012 | Venetos et al. |
| 2012/0234311 A1 | 9/2012 | Johnson et al. |
| 2012/0255309 A1 | 10/2012 | Venetos et al. |
| 2012/0274069 A1 | 11/2012 | Venetos et al. |
| 2013/0062890 A1 | 3/2013 | Saar et al. |
| 2013/0092153 A1 | 4/2013 | O'Donnell et al. |
| 2013/0312411 A1* | 11/2013 | Newman ............... F03B 17/00 60/641.8 |
| 2014/0190469 A1 | 7/2014 | O'Donnell et al. |
| 2014/0216717 A1 | 8/2014 | O'Donnell et al. |
| 2014/0299120 A1 | 10/2014 | Klinkman et al. |
| 2014/0318792 A1 | 10/2014 | Chen et al. |
| 2014/0347757 A1 | 11/2014 | MacGregor et al. |
| 2014/0352304 A1 | 12/2014 | Arias et al. |
| 2015/0107246 A1 | 4/2015 | Bindingnavale Ranga |
| 2015/0285490 A1 | 10/2015 | O'Donnell et al. |
| 2015/0295158 A1 | 10/2015 | O'Donnell et al. |
| 2015/0345277 A1 | 12/2015 | Schooley et al. |
| 2016/0116188 A1 | 4/2016 | O'Donnell et al. |

FOREIGN PATENT DOCUMENTS

| | | |
|---|---|---|
| DE | 102009036550 | 5/2010 |
| EP | 0041725 | 12/1981 |
| JP | 2012106282 A | 6/2012 |
| WO | WO-8501339 | 3/1985 |
| WO | WO-2008131175 A1 | 10/2008 |
| WO | WO-2008153922 A1 | 12/2008 |
| WO | WO-2009105643 A2 | 8/2009 |
| WO | WO-2010040957 A2 | 4/2010 |
| WO | WO-2011053863 A2 | 5/2011 |
| WO | WO-2012006255 A2 | 1/2012 |
| WO | WO-2012006257 A2 | 1/2012 |
| WO | WO-2012006258 A2 | 1/2012 |
| WO | WO-2012107478 A1 | 8/2012 |
| WO | WO-2012128877 A2 | 9/2012 |

OTHER PUBLICATIONS

Bierman et al "Solar Enhanced Oil Recovery Plant in South Oman," SolarPaces 2013; pp. 10.

BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.

BrightSource Limitless, "Enhanced Oil Recovery Project—Coalinga," accessed Sep. 19, 2013, http://www.brightsourceenergy.com/coalinga, 2 pages.

International Search Report and Written Opinion for International Patent Application No. PCT/US2017/015409, Applicant: Glasspoint Solar, Inc., dated May 10, 2017, 14 pages.

Abengoa Solar Inc., "Advanced Thermal Storage for Central Receivers with Supercritical Coolants," DE-FG36-08GO18149,Jun. 15, 2010, 184 pages.

Abengoa Solar Inc., "Development of Molten-Salt Heat Transfer Fluid Technology for Parabolic Trough Solar Power Plants," Abengoa Solar Sunshot Conference Project Review, Apr. 24, 2013, 21 pages.

Adventures in Energy, "Separating Oil, Natural Gas and Water." 1 page, accessed Oct. 7, 2013.

Argonne National Laboratory, "Produced Water Volumes and Management Practices in the United States," Environmental Science Division, Sep. 2009, 64 pages.

Bierman et al "Performance of Enclosed Trough OTSG for Enhanced Oil Recovery," SolarPaces 2013, pp. 11.

Bradshaw, Robert W., "Effect of Composition on the Density of Multi-Component Molten Nitrate Salts," Sandia Report—Sandia National Laboratories, Dec. 2009, 18 pages.

Bradshaw, Robert W., "Viscosity of Multi-component Molten Nitrate Salts—Liquidus to 200°C," Sandia Report—Sandia National Laboratories, Mar. 2010, 20 pages.

Brosseau et al., "Testing Thermocline Filler Materials and Molten-Salt Heat Transfer Fluids for Thermal Energy Storage Systems Used in Parabolic Trough Solar Power Plants," Sandia Report—Sandia National Laboratories, Jul. 2004, 95 pages.

Carling et al., "Industrial Use of Molten Nitrate/Nitrite Salts," Sandia National Laboratories Energy Report, Dec. 1981, 34 pages.

Champion Technologies, "Enhanced Oil Recovery." 2 pages, accessed Oct. 7, 2013.

Federsel et al., "High-Temperature and corrosion behavior of nitrate nitrite molten salt mixtures regarding their application in concentrating solar power plants," ElSevier Ltd, ScienceDirect, 2015, 8 pages.

(56) References Cited

OTHER PUBLICATIONS

Flueckiger et al., "Design of Molten-Salt Thermocline Tanks for Solar Thermal Energy Storage," Purdue University—Purdue e-Pubs, 2013, 51 pages.

Flueckiger et al., "Thermocline Energy Storage in the Solar One Power Plant: An Experimentally Validated Thermomechanical Investigation," Proceedings of the ASME 2011 5th International Conference on Energy Sustainability, Aug. 7-10, 2011, 7 pages.

Gaggiolo et al., "An innovative concept of a thermal energy storage system based on a single tank configuration using stratifying molten salts as both heat storage medium and heat transfer fluid, and with an integrated steam generator," ElSevier Ltd., ScienceDirect, 2014, 10 pages.

Gianconia et al., "Demonstration of a 1 Mwe Co-generative CSP Plant Based on Direct Molten Salts in Linear Parabolic Concentrators up to 550°C," 2005, 5 pages.

Gomez, Judith C., "High-Temperature Phase Change Materials (PCM) Candidates for Thermal Energy Storage (TES) Applications," National Renewable Energy Laboratory, 36 pages.

Gomez-Vidal et al., "Castable cements to prevent corrosion of metals in molten salts," ElSevier Ltd., Solar Energy Materials and Solar Cells—ScienceDirect, 2016, 8 pages.

HITEC—Heat Transfer Salt, Technical Bulletin, Coastal Chemical Co., L.L.C., 10 pages.

John et al., "Concrete as a thermal energy storage medium for thermocline solar energy storage systems," ElSevier Ltd., ScienceDirect—Solar Energy, 2013, 11 pages.

John, Emerson Esmond, "The Development of a High Performance Concrete to Store Thermal Energy for Concentrating Solar Power Plants," University of Arkansas, Fayetteville, 2012, 195 pages.

Kolb et al., "Thermal Ratcheting Analysis of Advanced Thermocline Energy Storage Tanks," Sandia National Laboratories, 2011, 8 pages.

Pacheco et al., "Development of a Molten-Salt Thermocline Thermal Storage System for Parabolic Trough Plants," Proceedings of Solar Forum 2001 Solar Energy: The Power to Choose, Apr. 21-25, 2001, 9 pages.

PROZ, 'On the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.

Renewable and Sustainable Energy Reviews, "Energy Consumption and Water Production Cost of Conventional and Renewable-energy-powered Desalination Processes," ElSevier Ltd., ScienceDirect, 2013, 14 pages.

Technical Reference, "Sodium Bentonite: Its Structure and Properties," www.CETCO.com, 2013, 7 pages.

The Linde Group, "Enhanced Oil Recovery (EOR)", 1 page, accessed Oct. 7, 2013.

White, Joe L., "Reactions of Molten Salts with Layer-Lattice Silicates," Agronomy Departement, Purdue University, Lafayette, Indiana, 1954, 14 pages.

\* cited by examiner

SEPARATORS AND MIXERS FOR DELIVERING CONTROLLED-QUALITY SOLAR-GENERATED STEAM OVER LONG DISTANCES FOR ENHANCED OIL RECOVERY, AND ASSOCIATED SYSTEMS AND METHODS

CROSS-REFERENCE TO RELATED APPLICATION

The present application claims priority to U.S. Provisional Application No. 62/289,644, filed on Feb. 1, 2016 and incorporated herein by reference in its entirety.

TECHNICAL FIELD

Separators and mixers for delivering controlled-quality solar-generated steam over long distances, and associated systems and methods are disclosed. In particular embodiments, wet steam steam is separated into a vapor fraction flow (e.g., a dry steam flow) and a liquid fraction flow, each of which is directed to a target user (e.g., an enhanced oil recovery operation), where the flows can be re-combined prior to use.

BACKGROUND

As fossil fuels become more scarce, the energy industry has developed more sophisticated techniques for extracting fuels that were previously too difficult or expensive to extract. One such technique is to inject steam into an oil-bearing formation to free up and reduce the viscosity of the oil. Several techniques for steam injection presently exist, and are often referred to collectively as "Thermal Enhanced Oil Recovery," or "Thermal EOR." Representative steam injection techniques include cyclic, steamflood, steam-assisted gravity drainage (SAGD), and other strategies using vertical and/or horizontal injection wells, or a combination of such wells, along with continuous, variable-rate, and/or intermittent steam injection in each well.

One representative system for generating steam for steam injection is a fuel-fired boiler, having a once-through configuration or a recirculating configuration. Other steam generating systems include heat recovery steam generators, operating in a continuous mode. Thermal EOR operations often produce steam 24 hours per day, over a period ranging from many days to many years, which consumes a significant amount of fuel. Accordingly, another representative steam generator is a solar steam generator, which can augment or replace fuel-fired boilers. Solar steam generators can reduce fuel use, reduce operations costs, reduce air emissions, and/or increase oil production in thermal recovery projects. Solar steam generators, due to the necessarily large land area required for solar collectors, may be located at some distance from the point of use of the steam; as a result long interconnecting lines may be required. Solar steam generators necessarily deliver steam at varying flow rates as incoming sunshine varies. A challenge with such systems is that it can be difficult to maintain proper steam conditions in steam distribution lines in light of the varying output provided by the solar steam generator. Accordingly, there remains a need in the industry for systems and methods that reliably maintain steam conditions despite such variations.

DETAILED DESCRIPTION

Figure 1A:
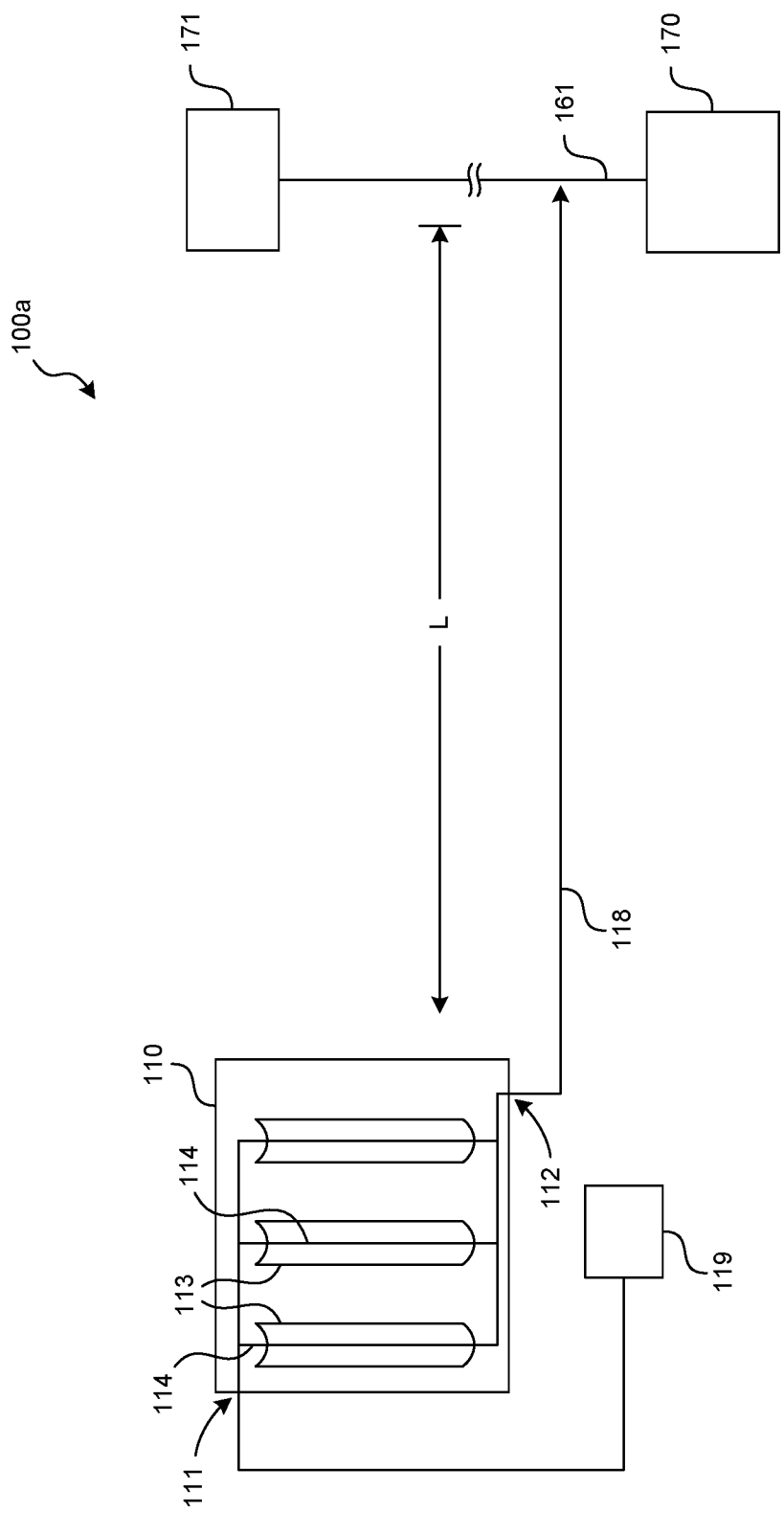
FIG. 1A is a partially schematic illustration of a solar field configured to deliver steam to a target user in accordance with an embodiment of the present technology.

The present technology is directed generally to separators and mixers for delivering controlled-quality solar-generated steam over long distances, and associated systems and methods. By definition, steam at less than 100% quality has a gas or vapor component and a liquid component. As used herein, "gas" and "vapor" are synonymous, and refer to the gaseous phase of a substance (e.g., water). At some (relatively higher) flow velocities, the liquid component is entrained as droplets within the flowing gas or vapor. At some (relatively lower) flow velocities, separation of the liquid and vapor fractions may occur. Separated liquid fractions are undesirable, as problems arise, including but not limited to, incorrect instrument readings and/or damage to the steam distribution system from "water hammer" as liquid fractions may flow as "slugs". These problems may be particularly significant in conduits carrying steam over long distances, as pressure drop rises linearly with conduit length for a given conduit diameter and flow rate. To mitigate excessive pressure drop, a common design practice is to use steam lines of larger diameter, reducing flow velocity and associated pressure drop. Thus, for the same mass of steam, flow velocities are lower than they would be in a smaller diameter conduit. The lower flow velocity at low mass flow rates further increases the propensity for liquid-vapor separation.

In particular embodiments of the present technology, representative systems and methods include separating steam having a quality of less than 100% into a gas or vapor component (e.g., dry, non-superheated steam) and a liquid component. The vapor and liquid components are then separately directed to a target user, e.g., a power generation facility, an enhanced oil recovery facility, a process heat user and/or another suitable industrial facility. In one embodiment, the two flows are re-mixed or re-combined to obtain the proper steam quality, prior to use at the facility. The steam is then used for enhanced oil recovery, generating electrical power and/or other industrial processes. Because the separated vapor fraction contains few or no entrained liquid droplets, it is less likely to separate at low flow velocities. Low flow velocities often occur during solar steam generation, e.g., at the beginning and end of the day when the sun is low, and during periods of cloud cover. Accordingly, as will be described in further detail below, separating and re-mixing the vapor and liquid components can prevent damage to the steam distribution network and provide for a more reliable level of steam quality, despite the variations in the amount of steam produced by the solar steam generator.

Particular embodiments are described below in the context of steam generated for enhanced oil recovery operations. In other embodiments, the steam may be used for electrical power generation, process heat, and/or other uses. Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the present technology.

FIG. 1A is a partially schematic illustration of a first system 100*a* configured in accordance with an embodiment of the present technology. The overall system 100*a* can include a solar field 110 that receives water from a working fluid supply 119, heats the water to steam, and delivers the steam to a target user 170 via a steam conduit 118. The solar field 110 can accordingly include an inlet 111 via which water enters from the working fluid supply 119. At the solar field 110, one or more concentrators 113 focus incoming solar radiation on corresponding receivers 114 (e.g., elongated conduits) to heat the incoming water to steam. The steam is provided to the steam conduit 118 via an outlet 112.

The rate at which steam is produced by the solar field 110 is variable, e.g., due to variations in solar insolation that occur naturally over the course of a 24 hour period. Solar insolation is typically measured as Direct Normal Irradiance (DNI) and varies from zero (at night) to a peak value (typically at or around noon). Solar insolation also varies as a function of cloud cover, weather patterns, and season (e.g., due to the changing angle of inclination of the earth's axis relative to the sun). As a result of the foregoing variations, the system 100*a* can include an additional steam source 171 to supplement the steam provided by the solar field 110. In a representative embodiment, the additional steam source 171 can include a fuel-fired steam generator that burns hydrocarbon fuel (e.g., natural gas) to supplement the steam provided by the solar field 110. A header 161 allows steam from the solar field 110 and/or the additional steam source 171 to be directed to the target user 170.

In at least some embodiments, the solar field 110 can be positioned a significant distance L from the target user 170. For example, in some embodiments, L can range from hundreds of meters to multiple kilometers. In particular embodiments, L can have values of 100 meters, 200 meters, 500 meters, 1000 meters, 2000 meters, or more, depending, for example on the nature of the target user. For example, when the target user includes an oil field, L can have values toward the higher end of those listed above, so that the solar field does not interfere with the ability to place oil extraction wells and/or steam injection wells where they are expected to produce significant oil output. These long distances can present challenges to transporting steam without excessive loss of pressure or heat while maintaining mixed gas-liquid flow. In particular, the steam conduit 118 may require insulation to prevent the steam from cooling significantly over the distance L. Also, the steam conduit 118 may be required to be of a relatively larger diameter (to reduce the flow velocity and accompanying pressure drop per unit distance), than would be used for a shorter steam transport distance. Maintaining proper steam characteristics—mixed gas/liquid flow—within the steam line becomes challenging due to variations in the steam flow rate. For example, the diameter of the steam conduit 118 may be selected to carry the peak flow rate of steam at a target steam quality level (e.g., 80%) at a low enough velocity to reduce pressure drop in the conduit. However, when the steam flow rate is below the peak value (e.g., as the solar field is starting up after sunrise, shutting down toward sunset and/or when cloud cover reduces solar insolation), the velocity of the steam within the steam conduit 118 drops. As the velocity drops, moisture in the steam is more likely to condense and precipitate, creating a two-phase flow. The two-phase flow will typically include slowly moving liquid phase and more rapidly moving gas phase passing over the liquid water. Waves and liquid slugs commonly form at the interface between the gas phase and the liquid phase, and, as such waves build in amplitude, can produce hammer shocks and/or other effects that not only further reduce the uniformity of the flow, but can also cause significant damage to the steam conduit 118 and/or associated equipment.

An additional drawback associated with sizing the steam conduit 118 to handle the maximum flow rate of steam at the target steam quality is that, in at least some embodiments, the conduit can become quite large. For example, in some embodiments, the conduit can exceed 16 inches in diameter. At such diameters, the cost of the conduit itself, and the cost of welding sections of the conduit together can increase dramatically, thereby reducing the cost effectiveness of solar generated steam.

Figure 1B:
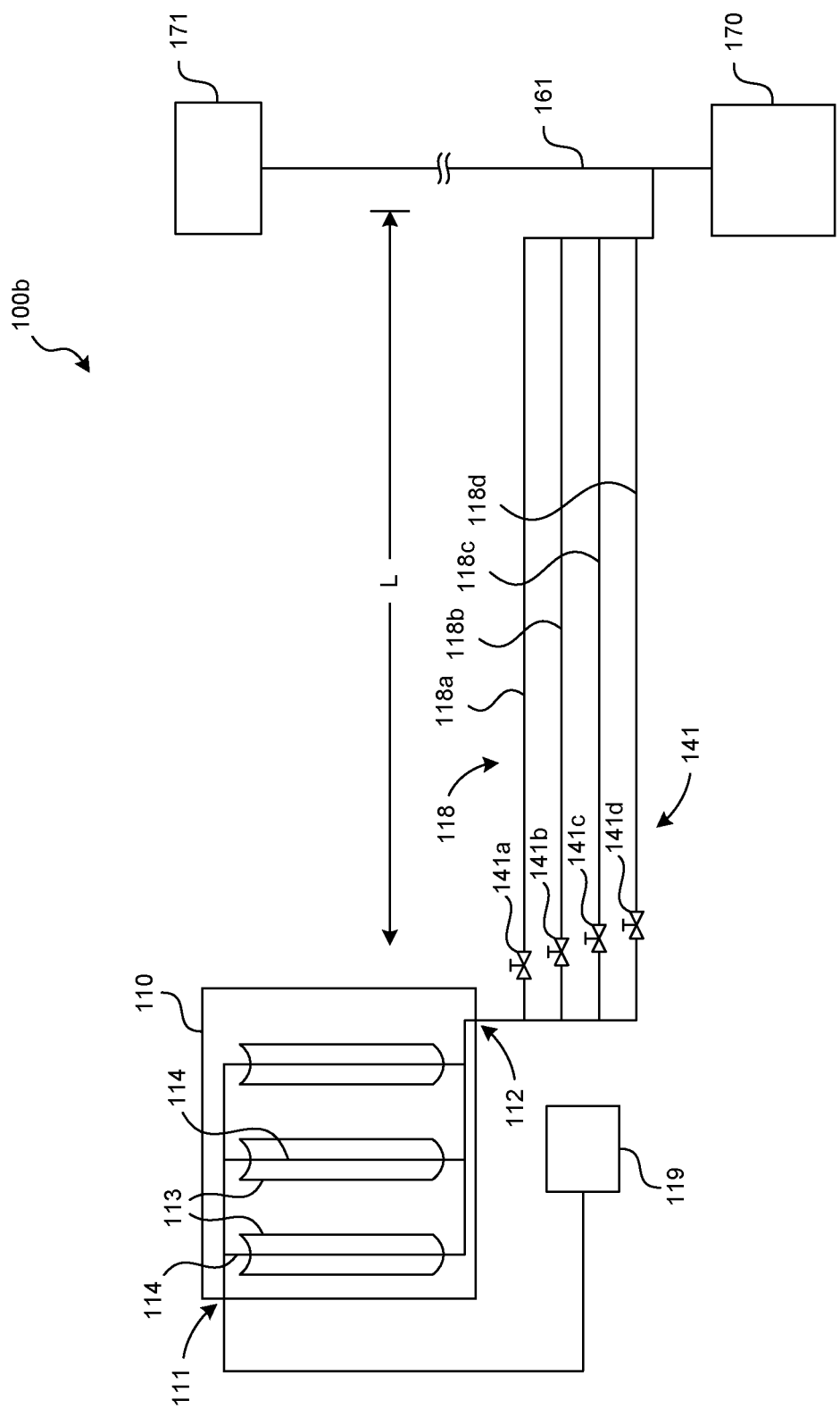
FIG. 1B is a partially schematic illustration of a solar field configured to deliver steam to a target user via multiple steam lines in accordance with another embodiment of the present technology.

One approach to addressing the foregoing potential drawbacks is illustrated in FIG. 1B. FIG. 1B shows a second system 100*b* that is generally similar to the first system 100*a* described above with reference to FIG. 1A, but includes multiple steam conduits 118. A representative number of four steam conduits 118 are illustrated as first-fourth steam conduits 118*a*-118*d*. Each steam conduit 118 can include a valve 141 (four are illustrated as first-fourth valves 141*a*-141*d*). At low steam flows, a single steam conduit (e.g., the first steam conduit 118*a*) can be opened to maintain high steam velocity (and therefore less condensation and precipitation) during system startup, shutdown, and/or periods of high cloud cover. When the output from the solar field 110 is higher than can be handled by the single steam conduit, the operator (or the system 100*b*, operating autonomously or under the guidance of the operator) can open additional steam conduits. In this manner, each steam line 118a-118d can supply steam at a relatively high flow velocity, and the combination of multiple steam lines can produce the target flow rate.

One potential drawback with the arrangement described above with reference to FIG. 1B is that the multiple individual lines can increase the cost of the system. In particular, each line represents an additional cost on its own, and each line must be insulated, thus adding to the cost. The additional valving increases system complexity and typically system cost as well. Furthermore, transmitting steam through multiple lines causes greater heat loss than transmitting the same amount of steam through a larger, single conduit, and therefore reduces the efficiency with which steam is provided to the target user 170.

Figure 1C:
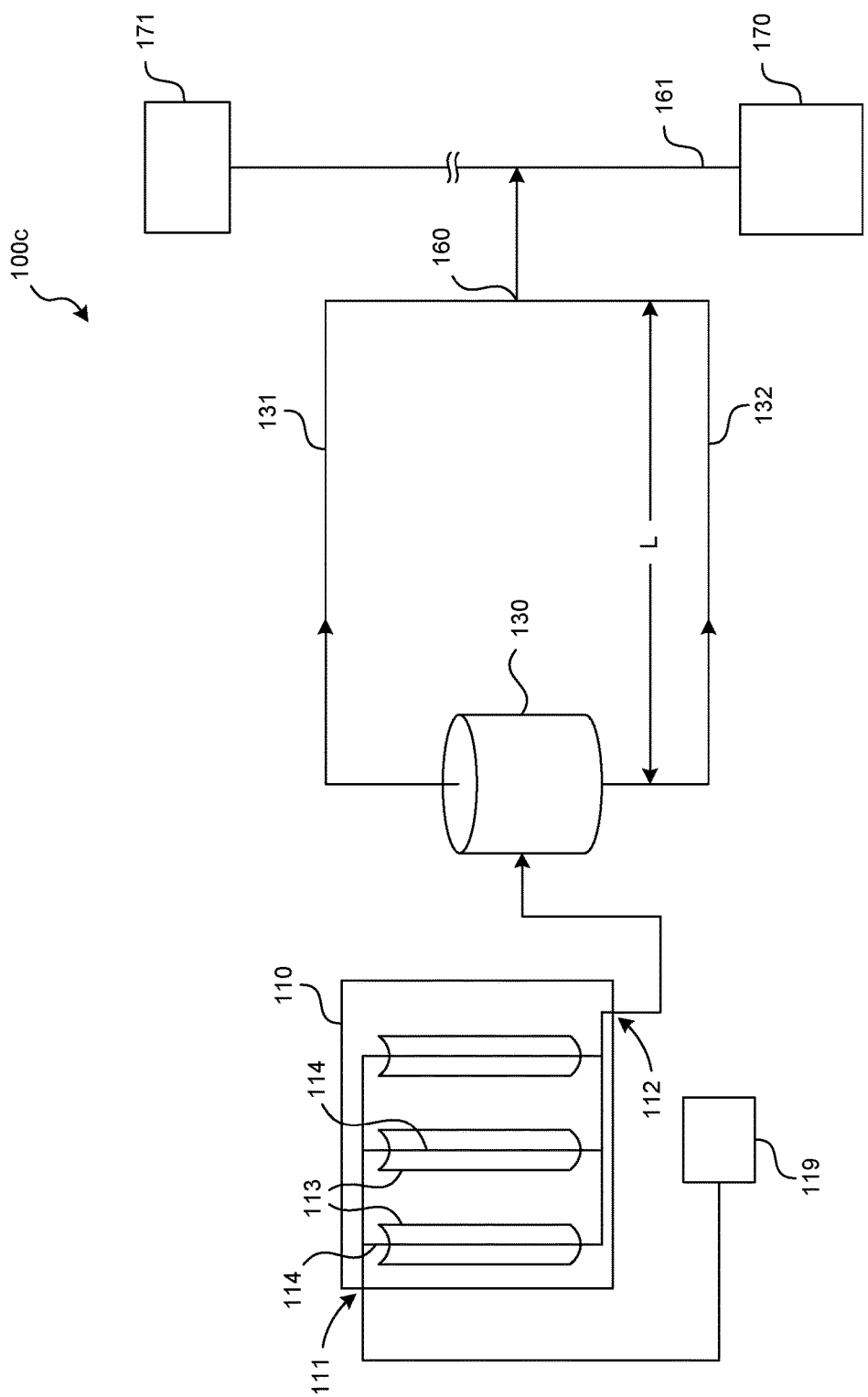
FIG. 1C is a partially schematic illustration of a system for separating a vapor fraction of steam (e.g., dry steam) from a liquid fraction, and optionally recombining the vapor fraction and liquid fractions prior to delivery to a target user, in accordance with still another embodiment of the present technology.

FIG. 1C illustrates a third system 100c configured in accordance with another embodiment of the present technology to address the foregoing drawbacks. The system 100c includes a solar field 110 having concentrators 113 and receivers 114 that receive water from the corresponding working fluid supply 119 and direct steam to a separator 130. At the separator 130, the incoming wet steam (which has a quality significantly under 100%) is separated into gas and liquid fractions. The gas or vapor fraction (e.g., dry steam or steam having a quality of 95%-99.5%) is directed through a vapor fraction conduit 131, and the liquid fraction (having a quality of 0%) is directed through a liquid fraction conduit 132. The vapor and liquid fractions can travel in parallel paths over the distance L. Prior to reaching the header 161, the flows can be mixed at a mixer 160 to provide steam to the target user 170 at the proper quality.

In other embodiments, the two flows are not mixed. For example, only the vapor fraction may be put to a revenue-generating use (e.g., power generation or enhanced oil recovery) at the target user 170, while the liquid fraction is disposed of. It may nevertheless be advantageous to transport the liquid fraction to the target user 170 for disposal because the user may have other steam generation sources that also produce a liquid fraction that is to be disposed of. For example, the target user 170 may have a fossil-fuel-fired boiler that produces a vapor flow and a liquid flow. By transporting the liquid fraction produced by solar energy to the target user 170, the two liquid flows can be consolidated for disposal, thereby avoiding the need for two separate liquid disposal processes (one at the solar field and another at the user).

An advantage of the arrangement shown in FIG. 1C is that, because the vapor fraction is delivered via the separate vapor fraction conduit 131, little or no liquid separation occurs in the vapor fraction conduit 131, even over a wide range of flow rates and therefore flow velocities. For example, this arrangement is expected to handle a typical daily steam flow rate variation of 7:1 without forming a significant amount of separated liquid in the vapor fraction conduit 131. In addition, because the liquid fraction is also supplied to the target user 170, the quality of the steam delivered to the target user 170 can be re-established at the mixer 160, e.g., without the need for additional steam and/or water.

Figure 2A:
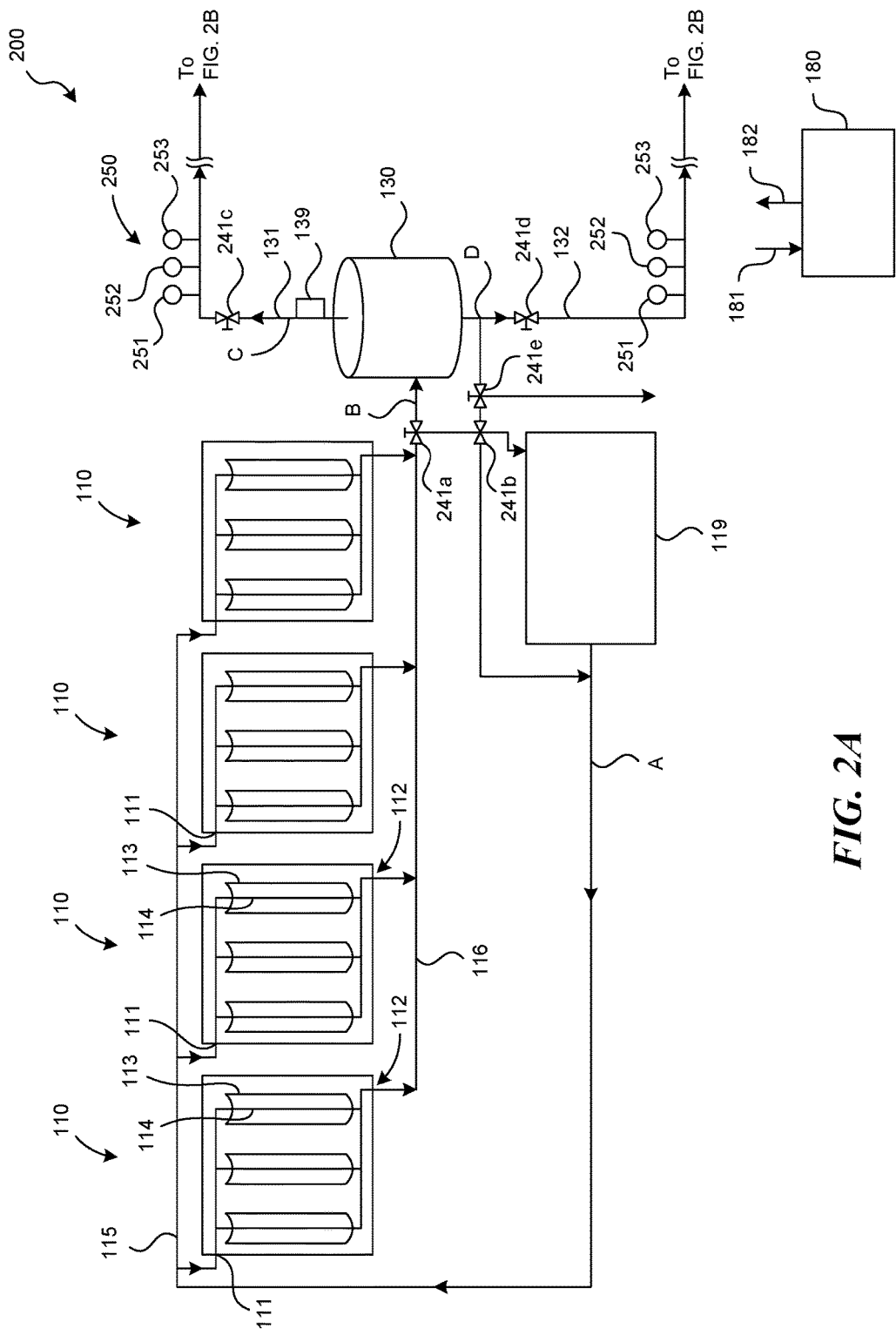
FIGS. 2A and 2B illustrate further details of a system having an overall arrangement generally similar to that described above with reference to FIG. 1C, configured in accordance with an embodiment of the present technology.
Figure 2B:
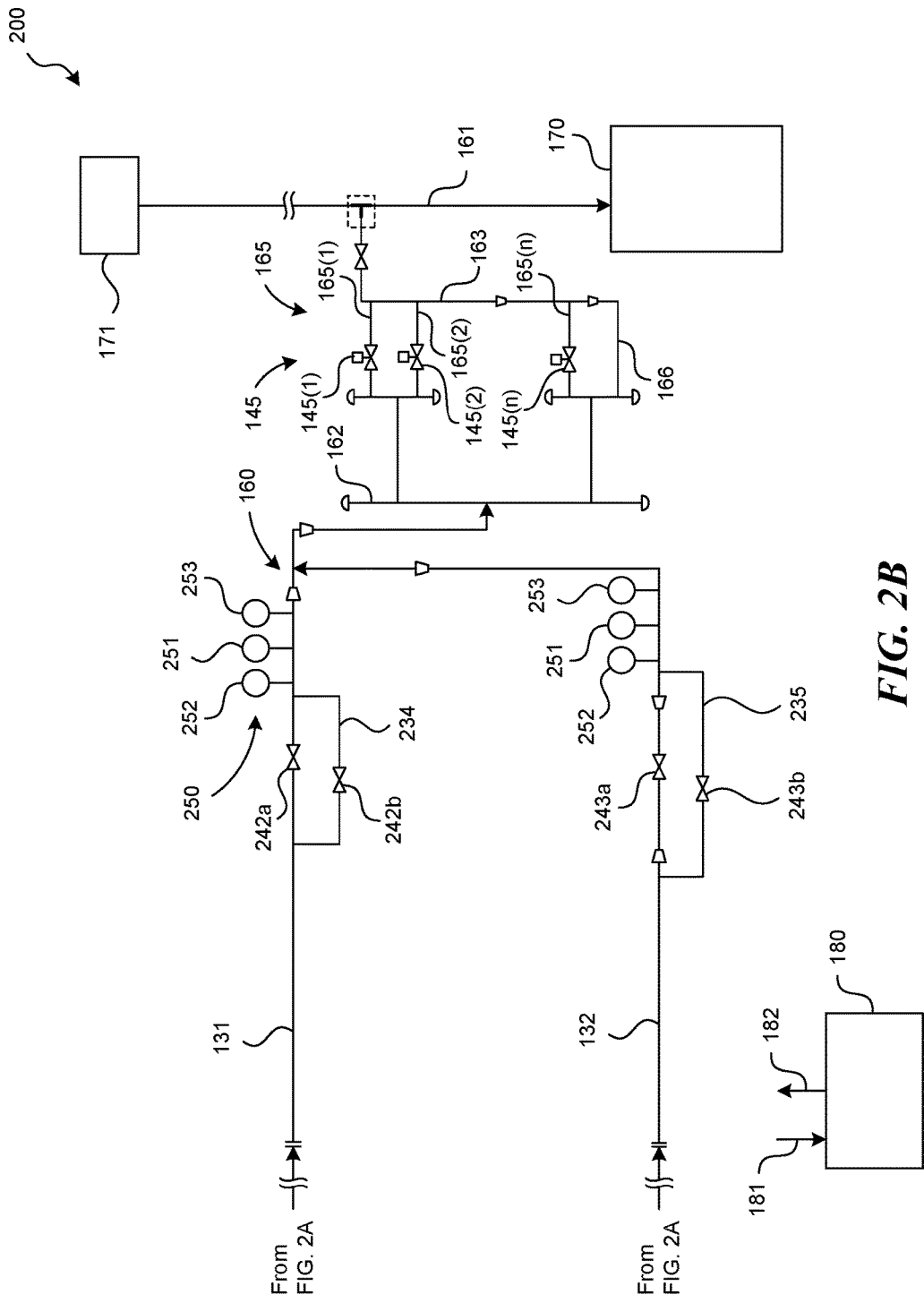

FIGS. 2A-2B illustrate further details of a representative system 200 having a configuration generally similar to that shown in FIG. 1C. In particular, FIG. 2A illustrates features of a system having elements the same as or similar to those on the left side of FIG. 1C, and FIG. 2B illustrates features of the system having elements the same as or similar to those on the right side of FIG. 1C.

Beginning with FIG. 2A, the system 200 can include multiple solar fields 110, each having a corresponding inlet 111, outlet 112, multiple concentrators 113, and multiple receivers 114. An inlet header 115 delivers water to each of the solar fields 110 from a working fluid supply 119, as indicated by arrow A. In a particular embodiment, the system 200 can include a flow measurement or pH control device 139 coupled to the fluid flow network, e.g., at the vapor fraction conduit 131. The control device 139 can sense pH, conductivity, steam flow rate, and/or other parameters, and may inject amine or another suitable corrosion inhibitor compound to manage the alkalinity of the dry steam 131 and reduce the likelihood of corrosion in the vapor fraction conduit 131. For example, the working fluid supply 119 may include feedwater with a high concentration of carbonate. When the carbonate dissociates (e.g., at high temperatures), it releases $CO_2$ into the vapor fraction. When the vapor fraction condenses (as at least some of it likely will), the condensate and $CO_2$ can produce carbonic acid ($H_2CO_3$) which if unaddressed, can corrode components of the system. In other embodiments, other suitable techniques can be used to monitor and/or control steam pH, and the devices used to perform the monitoring/control functions can be positioned at other locations of the system (e.g., near the mixer 160, in addition to or in lieu of near the separator 130).

An outlet header 116 collects steam (e.g., wet steam) from each solar field 110 and delivers the steam to the separator 130, as indicated by arrow B. A vapor fraction (e.g., dry steam is directed from the separator to the vapor fraction conduit 131, as indicated by arrow C, and a liquid fraction (removed from the wet steam at the separator 130) is delivered to the liquid fraction conduit 132, as indicated by arrow D. A first valve 241a controls the flow of steam into the separator 130, a second valve 241b controls the return of water to the working fluid supply 119, a third valve 241c controls the flow of vapor in the vapor fraction conduit 131, a fourth valve 241d controls the flow of liquid in the liquid fraction conduit 132, and a fifth valve 241e controls the return of the liquid from the liquid fraction conduit 132 to the working fluid supply 119 or to a system exit. Further details of the operation of the foregoing valves are described later.

The system 200 can also include one or more sensors 250 distributed at various points throughout the fluid flow network. Representative sensors include a temperature sensor 251, a pressure sensor 252, and a flow rate sensor 253. In other embodiments, the sensors 250 can be of other suitable types to perform other suitable functions. In any of these embodiments, the sensors 250 (and/or other data sources) provide inputs 181 to a controller 180. The controller 180 processes the inputs 181 and issues outputs 182 for controlling any of a variety of suitable aspects of the operation of the system 200. Such aspects can include instructions for controlling the valves described above.

One feature of an embodiment shown in FIG. 2A is that the solar generation capability of the system 200 can be distributed over multiple solar fields 110. As the overall system 200 is being manufactured, individual solar fields 110 may be completed in series, rather than in parallel, in order to provide at least some solar energy early in the process of manufacturing the overall system. As each new solar field 110 comes online (e.g., changes state from non-operational to operational), the system 200 must handle the additional steam flow rate provided by the newly operational solar field 110. Accordingly, in addition to handling daily variations in steam flow rates, the system 200 can accommodate flow rate variations resulting from different numbers of solar fields 110 being operational at any point in time.

FIG. 2A, described above, illustrates features of the system generally associated with generating the steam from solar energy at one or more solar fields. FIG. 2B, which is a continuation of FIG. 2A, illustrates features of the system 200 proximate to the target user 170. In particular, FIG. 2B illustrates the vapor fraction conduit 131 and the liquid fraction conduit 132 as they (optionally) join at the mixer 160. In particular embodiments, the mixer 160 can include a simple joint of the two conduits. In other embodiments, the mixer 160 can include more complex devices that mix the vapor from the vapor fraction conduit 131 with the water from the liquid fraction conduit 132 to produce wet steam at a desired quality level.

Two related parameters that can be important for maintaining the target steam characteristics (including the mixing of phases) are steam flow velocity and turbulence level. In particular, directing the wet steam to flow at a high velocity, and a high turbulence level can improve steam uniformity characteristics. To facilitate this approach, the system 200 can include a second header 162 and a third header 163 disposed between the mixer 160 and a first header 161. Multiple parallel lines 165 (identified as lines 165(1), 165(2), . . . 165(n)) extend between the second header 162 and the third header 163, with each line individually controlled by a corresponding line valve 145(1), 145(2) . . . 145(n). An additional line 166 can remain open at all times. The individual lines 165 can be selectively opened or closed by actuating the corresponding valves 145 as the wet steam flow increases or decreases. This approach can be used to maintain a high flow velocity and high level of turbulence between the mixer 160 and the first header 161, so as to prevent or at least restrict the likelihood for the flow to separate into a two-phase flow. Because the lines 165 are short and are generally co-located near the target user 170, the problem of heat loss associated with long parallel lines (described above with reference to FIG. 1B) is not expected to be an issue.

The vapor fraction conduit 131 and/or the liquid fraction conduit 132 can include a bypass line and corresponding valves. For example, the vapor fraction conduit 131 can include a main vapor fraction valve 242a, a vapor fraction bypass line 234, and an associated vapor fraction bypass valve 242b. The liquid fraction conduit 132 can include a main liquid fraction valve 243a, a liquid fraction bypass line 235, and an associated conduit bypass valve 243b. During overall system startup operations, the bypass valves 242b, 243b are opened and the bypass lines 234, 235 route flow around the main valves 242a, 243a. During normal day and nighttime operation, described further below, the main valves 242a, 243a remain open.

The typically daily operation of the overall system 200 is described further below with reference to FIGS. 2A and 2B. During the middle of the day, the vapor fraction conduit 131 contains (e.g., is filled with) vapor, and the liquid fraction conduit 132 contains (e.g., is filled with) water. As the sun sets, the flow rate of vapor through the vapor fraction conduit 131 slows, but, because the vapor is dry (or has a quality of at least 95% at the separator 130), liquid water does not precipitate despite the reduced vapor flow velocity. The flow rate of liquid water through the liquid fraction conduit 132 also slows. When the solar fields 110 shut down for the day (e.g., inactive), a small flow of steam from the additional steam source 171 is directed backwards through the vapor fraction conduit 131 to the separator 130 to keep the vapor fraction conduit 131 warm overnight.

At the end of the day, the liquid fraction conduit 132 can be drained so as to avoid starting up the next morning with a large mass of cold water. In particular, the water in the liquid fraction line 132 can be directed from the liquid fraction conduit 132 through the fifth valve 241e where it is either dumped, or directed through the second valve 241b into the working fluid supply 119. Removing the water from the liquid fraction conduit 132 eliminates the need to keep the water warm overnight. Instead, steam from the additional steam source 171 can be directed backward through the liquid fraction conduit 132 at night to keep it warm, e.g., in generally the same manner discussed above for the vapor fraction line 131.

As operation begins the following morning, water is initially directed from the working fluid supply 119 through the solar fields 110, and back to the solar fields 110 via the first and second valves 241a, 241b until the target steam quality is achieved. As the solar fields 110 increase in temperature, the controller 180 can fill the liquid fraction conduit 132 with hot water so that an ample supply of hot water is available for remixing at the mixer 160 when vapor begins flowing through the vapor fraction conduit 131. Accordingly, the liquid fraction conduit 132 can have a relatively small diameter to reduce the amount of time required to fill it with hot water during the daily startup process. Another approach, which can be used in addition to or in lieu of the small diameter liquid fraction line, is to begin directing wet steam to the separator 130 well before the target steam quality to be delivered to the target user 170 is achieved. For example, if the target steam quality for the target user 170 is 80%, the process can include directing steam to the separator when the quality is only 50%. The resulting high liquid fraction flow (due to the low quality of steam entering the separator 130) will quickly fill the liquid fraction line 132. As the quality of the steam produced at the solar fields increases, the first valve 241a directs (or continues to direct) steam to the separator 130. The separator 130 directs vapor through the vapor fraction conduit 131, and liquid fraction through the liquid fraction conduit 132. The mixer 160 then re-mixes the separate phases for delivery to the target user 170.

One feature of at least some of the embodiments described above with reference to FIGS. 1C-2B is that the arrangement of separators 130 and mixers 160 can provide a target steam quality to the target user 170 despite widely varying steam flow rates produced by the solar fields 110. For example, in a representative embodiment, the vapor fraction conduit 131 can handle a vapor flow rate variation of about 28:1 without producing two-phase flow. Accordingly, the system can begin delivering dry steam when the dry steam output of the separator 130 is only about 3.5% of the peak capacity of the vapor fraction conduit 131. As discussed above, the variation can be a daily variation as solar insolation changes, and/or a variation in the number of available solar fields. As described above, the number of available solar fields can vary as a result of a serial construction schedule. The number and/or output of available solar fields can alternatively or additionally vary based on routine and/or unplanned maintenance activities. In any of the foregoing cases, the improved ability of the system 200 to provide steam at the target quality level despite (a) system variations and (b) the long distance between the solar field(s) 110 and the target user 170, improves the overall efficiency with which steam is provided to the target user 170 and/or reduces the cost with which such steam is provided.

Figure 3A:
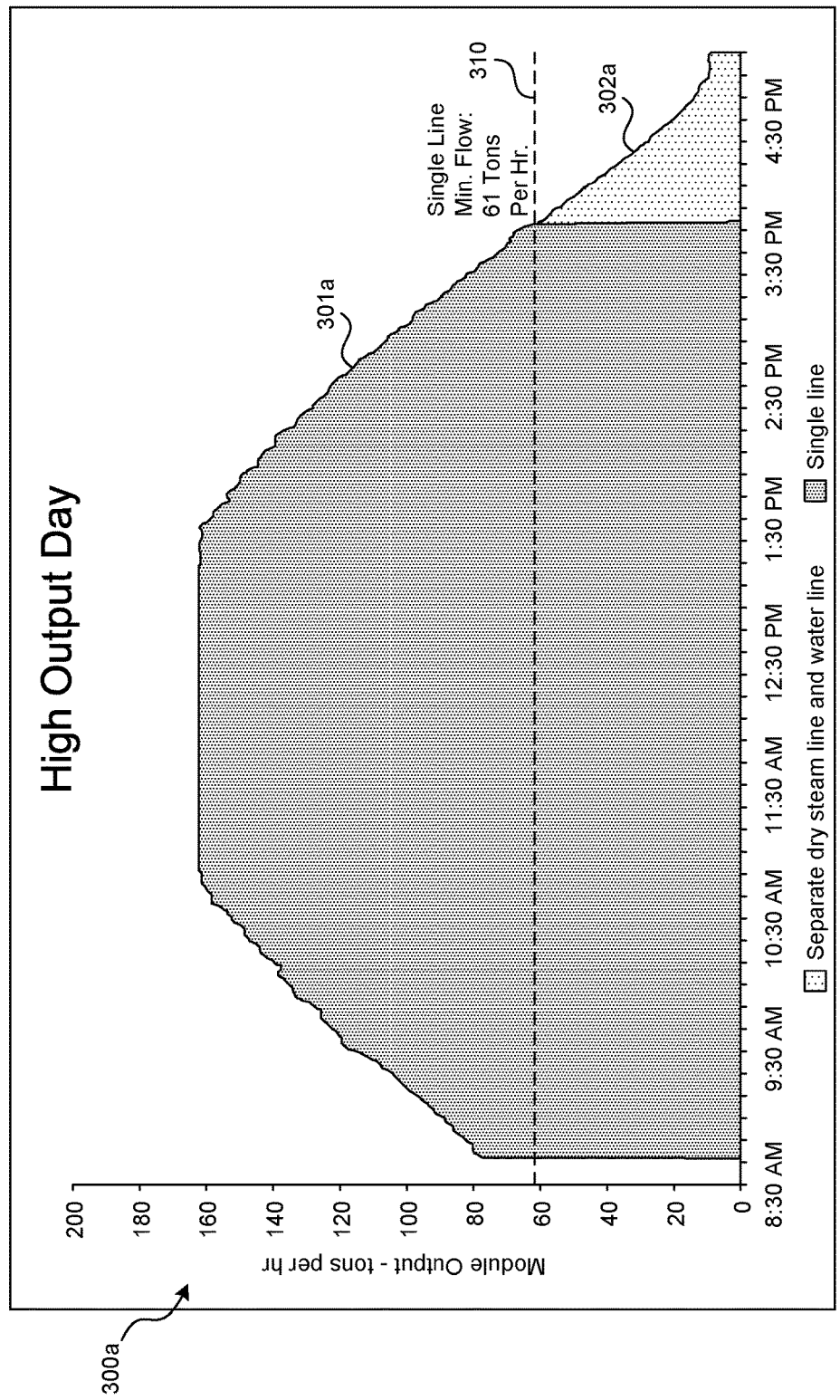
FIGS. 3A-3C illustrate the results of a simulation of a solar field output with a single output line, and with two output lines, one for a vapor fraction and one for a liquid fraction, during a high output day (FIG. 3A), an average output day (FIG. 3B), and a low output day (FIG. 3C).
Figure 3B:
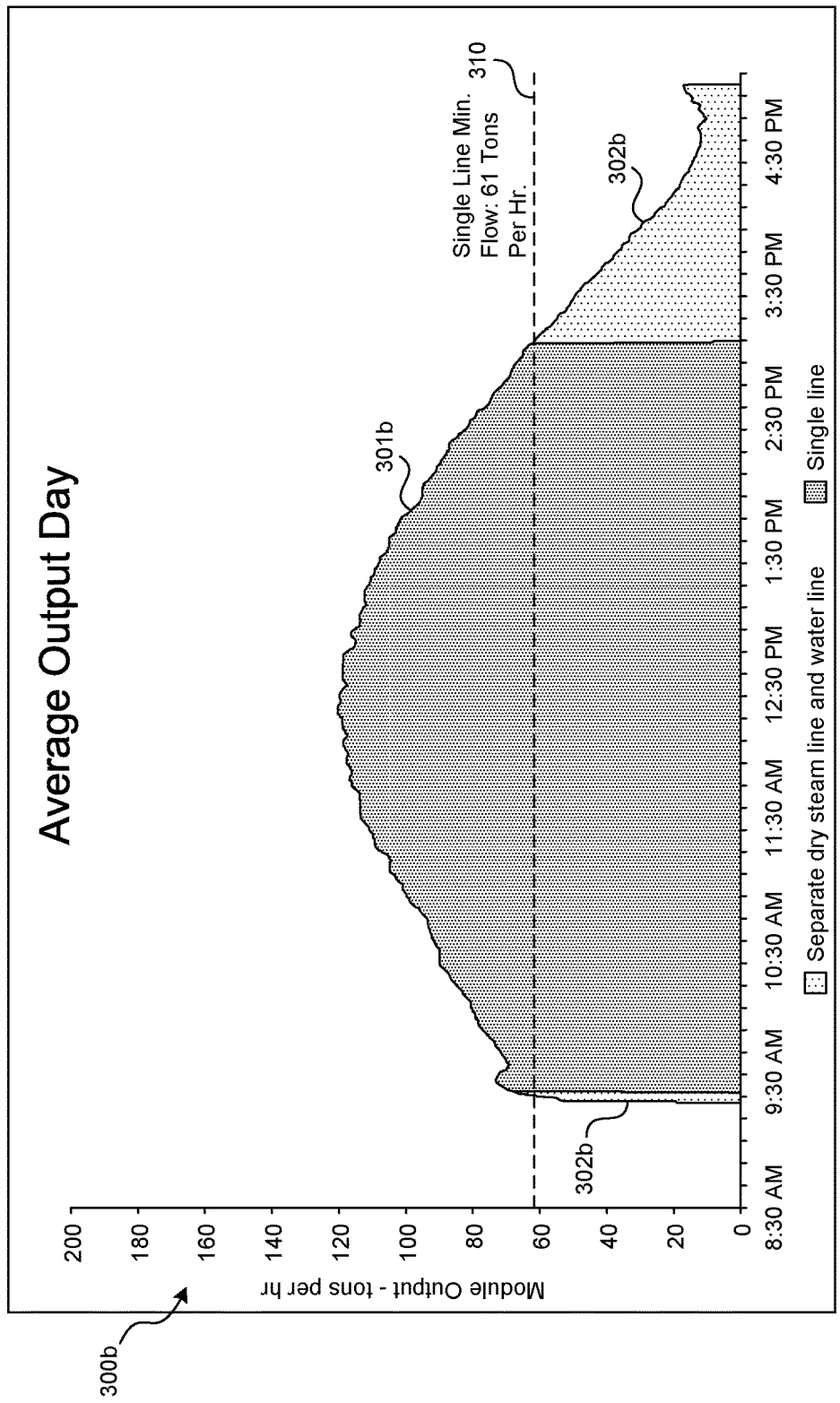
Figure 3C:
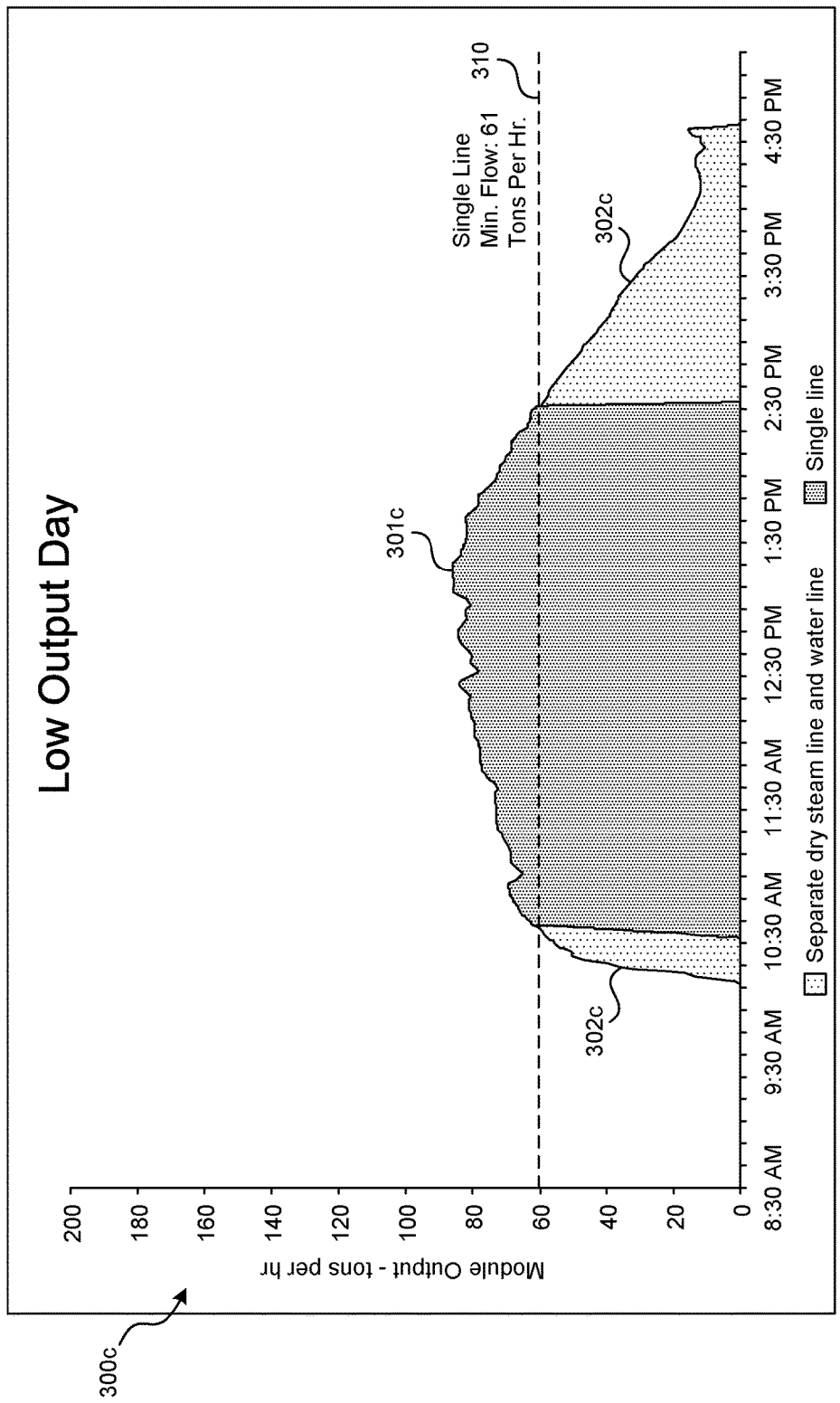

FIGS. 3A-3C illustrate the results from a simulation used to predict the output of a solar field with one output line (handling water in both gaseous and liquid phases) and two output lines (one handling vapor and the other handling liquid water). The simulation was run at conditions simulating a high output day, an average output day, and a low output day, as discussed below.

FIG. 3A illustrates a graph 300a of total output from a solar module (in tons of steam per hour) as a function of time of day. Region 301a illustrates the output for the solar field when coupled to a single output line, which has a minimum steam capacity 310 of 61 tons per hour. The solar field begins exporting steam shortly after 8:30 a.m. at a level that exceeds the minimum flow rate, and stops shortly after 3:30 p.m. when the output flow rate falls below the minimum value. Region 302a (in lighter gray) is the expected additional output available when the single output line is replaced with a dry steam line and a separate water line. Accordingly, region 302a indicates the additional amount of steam output that results from not being constrained by the minimum flow value of 61 tons per hour.

FIG. 3B is a graph 300b illustrating similar results on an average output day, rather than a high output day. Region 301b illustrates the output available with a single output line, and regions 302b illustrate the additional output available when a dry steam line and separate water line are substituted for the single output line.

FIG. 3C illustrates a graph 300c simulating the results for a low output day. As shown by the graph 300c, the output 301c available from a single output line is significantly enhanced by the additional outputs 302c available when the single output line is replaced with a dry steam line and a separate water line. Taken together FIGS. 3A-3C illustrate the additional output available from a given solar field when a single output line is a replaced with separate dry steam line and water line. FIGS. 3A-3C also indicate that the amount of the output increase, both as a percentage of the total and as an absolute value, increases as the overall output of the solar field decreases.

From the foregoing, it will be appreciated that specific embodiments of the disclosed technology have been described herein for purposes of illustration, but that various modifications may be made without deviating from the technology. For example, the solar fields described above are illustrated schematically as including trough-shaped, mirror-based solar concentrators. In other embodiments, the solar collection systems can include other types of solar collectors, including, but not limited to, point-source collectors, power-tower arrangements, dish-shaped collectors, and/or linear Fresnel collectors. Particular embodiments of the systems described above were described in the context of water as a working fluid. In other embodiments, the systems can operate in a generally similar manner using a different working fluid (e.g., a molten salt) that exchanges heat with water to create steam.

Certain aspects of the technology described in the context of particular embodiments may be combined or eliminated in other embodiments. For example, the degree to which the overall operation of the systems described above as automated can vary from one embodiment to another. Furthermore, particular embodiments of the disclosed technology were described in the context of solar EOR operations. In other embodiments, the same or generally similar technology can be applied to other types of operations that use solar-generated steam. Representative operations include electrical power generation and facility heating.

Still further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

To the extent any materials incorporated herein by reference conflict with the present disclosure, the present disclosure controls.

We claim:

1. A method for providing solar-heated steam to a target user, comprising:
   generating steam via a working fluid heated at a solar field, the solar field including at least one receiver carrying the working fluid, and at least one concentrator positioned to concentrate solar radiation on the at least one receiver;
   separating a liquid fraction from the steam;
   directing a vapor fraction of the steam toward the target user via a first, vapor fraction conduit; and
   directing at least part of the liquid fraction toward the target user in parallel with the vapor fraction via a second, liquid fraction conduit.

2. The method of claim 1, further comprising mixing the at least part of the liquid fraction and at least part of the vapor fraction to form a steam mixture, before delivering the steam mixture to the target user.

3. The method of claim 1, further comprising disposing of the liquid fraction without mixing the at least part of the liquid fraction and at least part of the vapor fraction to form a steam mixture.

4. The method of claim 1, further comprising:
   mixing the at least part of the liquid fraction with additional liquid water at the target user to form a water mixture; and
   disposing of the water mixture.

5. The method of claim 1 wherein the working fluid comprises water or a molten salt.

6. A method for providing solar-heated steam to a target user, comprising:
   heating water to steam at a solar field;
   separating a liquid fraction from the steam;
   directing a vapor fraction of the steam toward the target user via a first, vapor fraction conduit; and
   directing the liquid fraction toward the target user in parallel with the vapor fraction via a second, liquid fraction conduit,
   wherein the vapor fraction is dry, non-superheated steam.

7. The method of claim 1 wherein the vapor fraction has a quality of 95% or higher upon separation.

8. The method of claim 1 wherein the vapor fraction has a quality of 90% or higher immediately prior to mixing.

9. The method of claim 1 wherein the solar field is a first solar field, and wherein the method further comprises:
   after a period of time, changing a state of a second solar field from a non-operational state to an operational state; and
   with both the first and second solar fields in an operational state:
      directing vapor fractions from both the first and second solar fields toward the user via the vapor fraction conduit; and directing liquid fractions from both the first and second solar fields toward the user via the liquid fraction conduit.

10. The method of claim 1 wherein generating steam includes heating water to steam at a first rate and a second rate that is at least seven times the first rate, and wherein directing the vapor fraction includes directing the vapor fraction at both the first and second rates without separating liquid from vapor in the vapor fraction conduit.

11. The method of claim 1 wherein a flow rate of the vapor fraction varies from a first rate to a second rate at least 28 times the first rate, and wherein directing the vapor fraction includes directing the vapor fraction at both the first and second rates without separating liquid from vapor in the vapor fraction conduit.

12. The method of claim 1, further comprising draining liquid from the liquid fraction conduit when the solar field is inactive.

13. A solar steam generation system, comprising:
a solar field having at least one receiver and at least one concentrator positioned to concentrate solar radiation on the receiver, the receiver being in thermal communication with water to generate steam;
a separator positioned to receive the steam and separate a liquid fraction from the steam;
a vapor fraction conduit coupled to the separator to receive a vapor fraction of the steam from the separator, the vapor fraction conduit being positioned between the separator and a target steam user; and
a liquid fraction conduit coupled to the separator in parallel with the vapor fraction conduit to receive the liquid fraction from the separator, the liquid fraction conduit being positioned between the separator and the target steam user.

14. The system of claim 13, further comprising:
a mixer coupled to the vapor fraction conduit and the liquid fraction conduit downstream of the separator and upstream of the target steam user to receive and mix the vapor fraction and the liquid fraction; and
a target user supply conduit coupled between the mixer and the target steam user.

15. The system of claim 13, further comprising a controller operatively coupled to the vapor fraction conduit and the liquid fraction conduit, and programmed with instructions that, when executed:
direct steam from the target steam user toward the separator via the vapor fraction conduit when the solar field is inactive.

16. The system of claim 13, further comprising a controller operatively coupled to the vapor fraction conduit and the liquid fraction conduit, and programmed with instructions that, when executed:
direct steam from the target steam user toward the separator via the liquid fraction conduit when the solar field is inactive.

17. The system of claim 13 wherein the target steam user is spaced apart from the separator by a distance of at least 200 meters.

18. The system of claim 13 wherein the target steam user is spaced apart from the separator by a distance of at least 500 meters.

19. The system of claim 13 wherein the target steam user is spaced apart from the separator by a distance of at least 1000 meters.

20. The system of claim 13 wherein the target steam target user includes an enhanced oil recovery facility.

21. The system of claim 13, further comprising:
a mixer coupled to the vapor fraction conduit and the liquid fraction conduit downstream of the separator and upstream of the target steam user to receive and mix the vapor fraction and the liquid fraction;
two headers coupled to and positioned downstream of the mixer; and
a plurality of fluid conduits coupled in parallel between the two headers.

22. The system of claim 21 wherein the fluid conduits are sized to produce or maintain turbulent flow.

23. The system of claim 13 wherein the working fluid comprises water or a molten salt.

24. The system of claim 13 wherein the working fluid comprises a molten salt, and wherein the steam is generated by transferring heat from the molten salt to the water.

* * * * *